(12) United States Patent
Gallegos et al.

(10) Patent No.: US 7,997,839 B1
(45) Date of Patent: Aug. 16, 2011

(54) ATTACHABLE TIE-DOWN LOOP FOR A TRUCK AND METHOD OF USE THEREOF

(76) Inventors: Dean L. Gallegos, Bakersfield, CA (US); Bonnie F. Gallegos, Bakersfield, CA (US)

( * ) Notice: Subject to any disclaimer, the term of this patent is extended or adjusted under 35 U.S.C. 154(b) by 104 days.

(21) Appl. No.: 12/460,708

(22) Filed: Jul. 23, 2009

(51) Int. Cl.
*B61D 45/00* (2006.01)
*B60R 9/00* (2006.01)

(52) U.S. Cl. .... 410/106; 410/102; 410/110; 248/231.61

(58) Field of Classification Search .......... 410/101, 410/100, 103, 102, 116, 77, 106, 117, 96; B61D 45/00; B60R 9/00; B60P 7/08
See application file for complete search history.

(56) References Cited

U.S. PATENT DOCUMENTS

| | | | |
|---|---|---|---|
| 2,609,761 A * | 9/1952 | Clark | 410/101 |
| 4,297,963 A | 11/1981 | Beacom | |
| 4,607,991 A | 8/1986 | Porter | |
| 4,685,646 A * | 8/1987 | Harrison | 248/231.61 |
| 4,850,770 A * | 7/1989 | Millar, Jr. | 410/110 |
| 4,953,820 A * | 9/1990 | Yoder | 24/489 |
| 5,560,576 A * | 10/1996 | Cargill | 248/231.61 |
| 5,788,437 A | 8/1998 | Kalis, Jr. | |
| 5,915,900 A | 6/1999 | Boltz | |
| 6,196,602 B1 * | 3/2001 | Esplin | 296/3 |
| 6,256,844 B1 | 7/2001 | Wheatley | |
| 6,270,301 B1 * | 8/2001 | Dunlop | 410/115 |
| 6,350,089 B1 | 2/2002 | Tekavec | |
| 6,350,090 B1 | 2/2002 | Salmon et al. | |
| 6,416,265 B1 | 7/2002 | Flores et al. | |
| 6,464,437 B1 | 10/2002 | Elwell | |
| 6,547,311 B1 | 4/2003 | Derecktor | |
| 6,969,219 B2 | 11/2005 | Speece et al. | |
| 2001/0002973 A1 * | 6/2001 | Price | 410/106 |

* cited by examiner

*Primary Examiner* — Glenn Dayoan
*Assistant Examiner* — Sunsurraye Westbrook
(74) *Attorney, Agent, or Firm* — Montgomery Patent and Design; Robert C. Montgomery; Joseph T. Yaksich

(57) ABSTRACT

A tie-down attachment device and system for use in pickup trucks featuring a plurality of clamps that slide along the upper edge of the pickup truck bed rail used to hold bed caps in place without having to drill into the pickup truck bed is herein disclosed. The device comprises a clamping means that is secured by tightening a bolt with a strong grip or by wrench or pliers. The device further comprises a large eye bolt to which a strap, a rope, or other securing means can be connected and thus securing a load. The clamping device can be left in place on the bed rail or removed and stored when not in use.

19 Claims, 4 Drawing Sheets

ATTACHABLE TIE-DOWN LOOP FOR A TRUCK AND METHOD OF USE THEREOF

RELATED APPLICATIONS

The present invention was first described in a notarized Official Record of Invention filed on Jul. 22, 2008 at the offices of Montgomery patent and Design in Washington, Pa. There are no previously filed, nor currently any co-pending applications, anywhere in the world.

FIELD OF THE INVENTION

The present invention relates generally to tie-down anchor assemblies and, more particularly, to an attachable tie-down loop anchor which is removably mounted to an upper rail of a pickup truck bed.

BACKGROUND OF THE INVENTION

With sales at an all-time high, the popularity of the pickup style truck as an everyday vehicle is more wide spread than it ever has been. Their utility and convenience in hauling items coupled with the availability of luxury interiors and extended cab space have made the pickup a popular alternative to other vehicles. Many of these pickup trucks are equipped with tie-down hooks. These hooks are typically provided in the four stake posts holes provided in the upper rail of the pickup truck bed. Manufacturers may also provide hook assemblies within the bed itself to aid in attaching straps, ropes and other tie-down means. However, as handy as such tie-downs are, it seems they are never in the right location to adequately and safely tie down the cargo at hand. Another style of tie-down anchors are those which utilize a clamping means to attach to the upper rail of the truck bed. These anchors may provide improved flexibility regarding anchoring locations, but due to the manner in which they attach to the upper rail they suffer from the load forces applied. This bending force can damage the upper rail of the truck bed since the clamping assemblies do not provide suitable contact area to properly disperse the load created by the tie-down. Solutions to this bending force often require a user to use additional securing hardware to mount the anchor to the upper rail or otherwise prepare the truck bed for attachment of the anchor. As such, many users resort to devising improvised strapping methods which may result in damage to the cargo or truck at best or present a safety issue at worst.

Various attempts have been made in the past to overcome these problems and provide tie-down anchors for truck beds. These attempts can be seen by reference to several U.S. patents.

U.S. Pat. No. 6,256,844, issued in the name Wheatley, describes a tie-down anchor assembly for attachment to a side rail of a pickup truck bed. The Wheatley anchor assembly comprises an anchor plate with an upright portion, an anchor which protrudes from the anchor plate, and a clamp assembly that is secured via a threaded fastener.

U.S. Pat. No. 4,607,991, issued in the name of Porter, describes a tie-down anchor for a truck bed for use in securing loads to an open truck bed. The Porter anchor comprises a mounting platform, two (2) pivoting arms with a spring mounted between, and a tie fastening ring and is installed within the existing post receiving wells commonly provided on the t upper rail of a pickup truck.

U.S. Pat. No. 6,350,090, issued in the name of Salmon et al., describes an anchorage assembly which enables a vehicle accessory to the selectively mounted to a vehicle comprising a rectangular housing having a central cavity and an anchor which is partially disposed within the cavity. The Salmon et al. assembly further provides a resilient material within the cavity that absorbs vibrations and impact loads to the anchor.

U.S. Pat. No. 6,969,219, issued in the name of Speece et al., describes a cargo anchor for a truck bed sidewall top plate which covers a post receiving aperture for securing an anchor line. The Speece et al. anchor comprises an anchor bar for securing the anchor line to an anchor cover plate and a locator plate that is fastened to the cover plate with screws and engages the inside of the sidewall of the truck bed.

U.S. Pat. No. 5,915,900, issued in the name of Boltz, describes a cargo tie-down device for securing cargo and other loads to truck beds or supports. The Boltz device is installed within the post receiving well of the pickup truck comprises a rectangular first plate and an eye nut that are affixed to an elongated rod.

Other relevant attempts to address these problems can be seen by reference to several U.S. patents, including: U.S. Pat. No. 4,297,963 (Beacom); U.S. Pat. No. 5,560,576 (Cargill); U.S. Pat. No. 5,788,437 (Kalis, Jr.); U.S. Pat. No. 6,350,089 (Tekavec); U.S. Pat. No. 6,416,265 (Flores et al.); U.S. Pat. No. 6,464,437 (Elwell); and U.S. Pat. No. 6,547,311 (Dereck-tor).

While these devices fulfill their respective, particular objectives, each of these references suffers from one (1) or more deficiencies by failing to provide a tie-down anchoring assembly which addresses these disadvantages. Accordingly, there exists a need for a means by which tie-down points in a pickup truck bed can be provided where needed to safely secure cargo. The development of the present invention substantially departs from the conventional solutions and in doing so fulfills this need.

SUMMARY OF THE INVENTION

In view of the foregoing references, the inventor recognized the aforementioned inherent problems and observed that there is a need for a position adjustable tie-down strap anchor for an upper rail of a pickup truck bed that provides a secure contact surface with the sidewall of the upper rail and thus, the object of the present invention is to solve the aforementioned disadvantages and provide for this need.

To achieve the above objectives, it is an object of the present invention to provide an attachable tie-down loop for trucks that provides a removable means of attaching a tie-down assembly to multiple points on a truck bed or other similar vehicle without drilling or other preparation to the body of the vehicle.

Another object of the attachable tie-down loop for a truck is to provide a device comprising a tie-down loop for assisting a user to secure objects stored in a truck bed further comprising a "C"-shaped bracket adapted to be slidingly clamped to an upper rail of the truck bed, a "U"-shaped bracket adapted to be slidingly clamped to the upper rail of the truck bed, a bolt that is threadably interconnected to the "C"-shaped bracket and the "U"-shaped bracket respectively, an eye bolt connected to the "C"-shaped bracket and above the "U"-shaped bracket.

Yet still another object of the attachable tie-down loop for a truck is to provide a device where the "C"-shaped bracket cooperates with The "U"-shaped bracket to simultaneously clamp the upper rail of the truck bed while the eye bolt is adapted to receive an existing tie-down strap.

Yet still another object of the attachable tie-down loop for a truck is to provide a device where the "C"-shaped bracket and the "U"-shaped bracket linearly approach each other when the bolt is threadingly tightened and adapts corresponding edges of the brackets to clamp a horizontal wall of the upper rail of the truck bed.

Yet still another object of the attachable tie-down loop for a truck is to provide a method of utilizing the device that enables quick and easy securing of any object that is transported in a pickup truck bed in a safe manner which is quick, easy and effective.

Further objects and advantages of the attachable tie-down loop for a truck will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
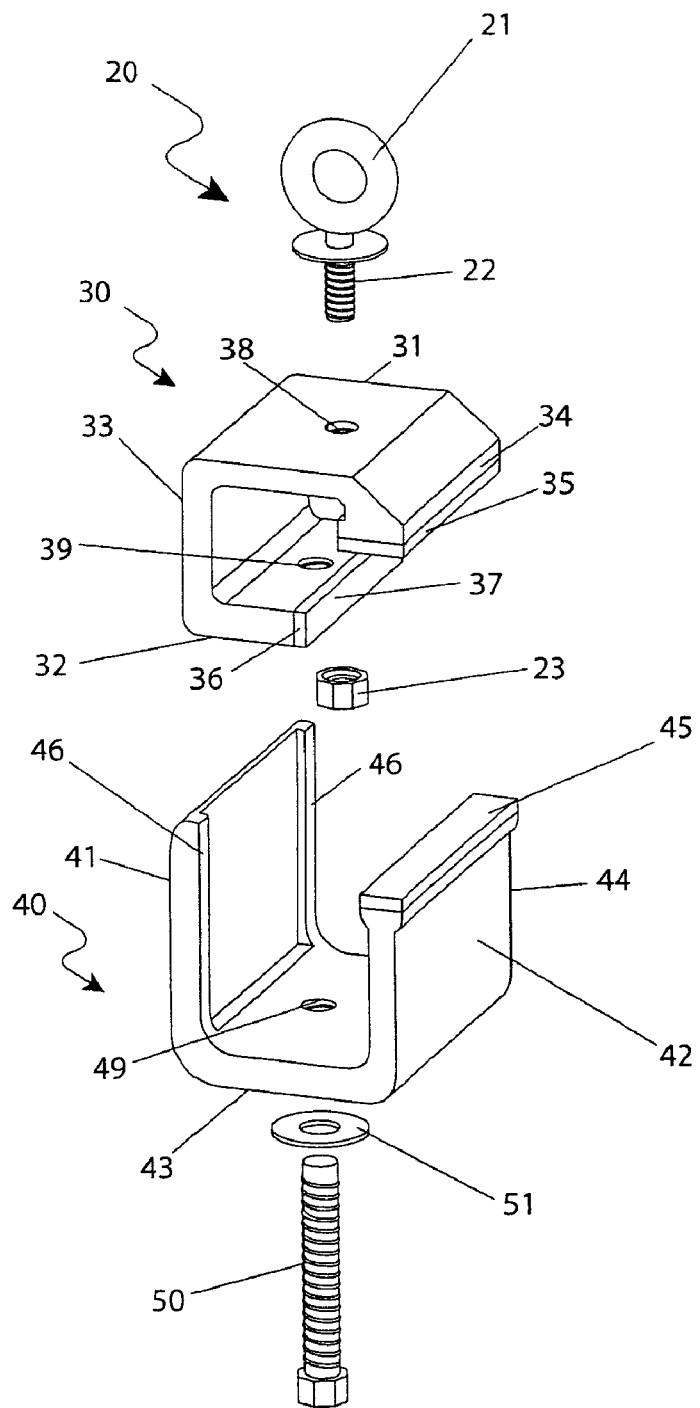
FIG. 1 is an exploded isometric view of an attachable tie-down loop for a truck 10, according to a preferred embodiment of the present invention.

| | |
|---|---|
| 10 | attachable tie-down loop for a truck |
| 20 | eye bolt |
| 21 | eyelet |
| 22 | stem |
| 23 | nut |
| 30 | "C"-shaped bracket |
| 31 | first horizontal side |
| 32 | second horizontal side |
| 33 | first vertical side |
| 34 | first edge |
| 35 | first liner |
| 36 | second edge |
| 37 | second liner |
| 38 | first aperture |
| 39 | second aperture |
| 40 | "U"-shaped bracket |
| 41 | second vertical side |
| 42 | third vertical side |
| 43 | third horizontal side |
| 44 | third edge |
| 45 | third liner |
| 46 | guide rail |
| 47 | third aperture |
| 50 | bolt |
| 51 | washer |
| 60 | truck |
| 61 | upper rail |
| 62 | side wall |
| 63 | horizontal wall |
| 70 | tie-down |
| 80 | object |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an attachable tie-down loop for a truck (herein described as the "device") 10, which provides a removable means of attaching a common tie-down 70 to multiple points on a truck 60 or other similar vehicle with no drilling or other preparation to the body of said truck 60. The device 10 comprises a "C"-shaped bracket 30 and a "U"-shaped bracket 40 which slidingly clamp thereto an upper rail 61 of a bed portion of the truck 60 and provides a superior holding and securing means for the tie-down 70.

Referring now to FIG. 1, an exploded isometric view of the device 10, according to the preferred embodiment of the present invention, is disclosed. The device 10 comprises an eye bolt 20, a "C"-shaped bracket 30, and a "U"-shaped bracket 40. The "C"-shaped bracket 30 slidingly engages the "U"-shaped bracket 40 and the two (2) brackets provide a clamping means. The "U"-shaped bracket 40 and the "C"-shaped bracket 30 comprise a preferred dimension of at least two (2) inches wide. The eye bolt 20 comprises expected features similar to standard eye bolt hardware fasteners such as an eyelet 21 and a lower threaded stem 22. The "C"-shaped bracket 30 comprises a first horizontal side 31, a second horizontal side 32, and a first vertical side 33. The "C"-shaped bracket 30 further comprises a first edge 34 which is located thereon a distal end of the first horizontal side 31.

The first edge 34 comprises an arcuate profile terminating ninety)(90° degrees therefrom the first horizontal side and provides a contact means therewith a top surface of the upper rail 61 of the truck 60. The first edge 34 is covered by a first liner 35 which is preferably a soft, flexible material such as rubber or the like which is affixed thereto and covers said first edge 34, thus preventing scratching or similar damage to the exterior of the truck 60. The second horizontal side 32 is shorter in length than the first horizontal side 31 and comprises a second edge 36 which is located thereon a distal end of the same. A first aperture 38 comprising a through hole is located thereon a center portion of the first horizontal side 31. The first aperture 38 receives the stem 22 of the eye bolt 20 which is inserted therethrough and secured thereto the "C"-shaped bracket via a nut 23.

The "U"-shaped bracket 40 comprises a second vertical side 41, a third vertical side 42, and a third horizontal side 43. The "U"-shaped bracket 40 further comprises a third edge 44 which is located thereon a distal end of the third vertical side 42. The third edge 44 provides a contact means therewith a bottom surface of the upper rail 61 and comprises a third liner 45 which is affixed thereto and covers said third edge 44, thus preventing scratching or similar damage to the exterior of the truck 60. The "U"-shaped bracket further comprises two (2)

guide rails 46 which are located on opposing outside edges of an inner surface of the second vertical side 41. The guide rails 46 provide a guide track and receiving slot for the outer surface of the first vertical side 33, such that the "U"-shaped bracket 40 provides a stabilizing means thereto the "C"-shaped bracket. The "C"-shaped bracket 30 is connected thereto the "U"-shaped bracket 40 via a bolt 50 which threadingly engages a threaded second aperture 39 which is located therethrough the second horizontal side 32 and a threaded third aperture 47 which is located therethrough the third horizontal side 43. The second aperture 39 is superjacently aligned therewith the third aperture 47 such that when the bolt 50 is turned in a clockwise manner the second horizontal side 32 of the "C"-shaped bracket 30 approaches the third horizontal side 43 of the "U"-shaped bracket 40, thus closing or tightening the device 10 such that the first edge 35 and the third edge 44 clamp to the upper rail 61 of the truck 60.

Figure 2:
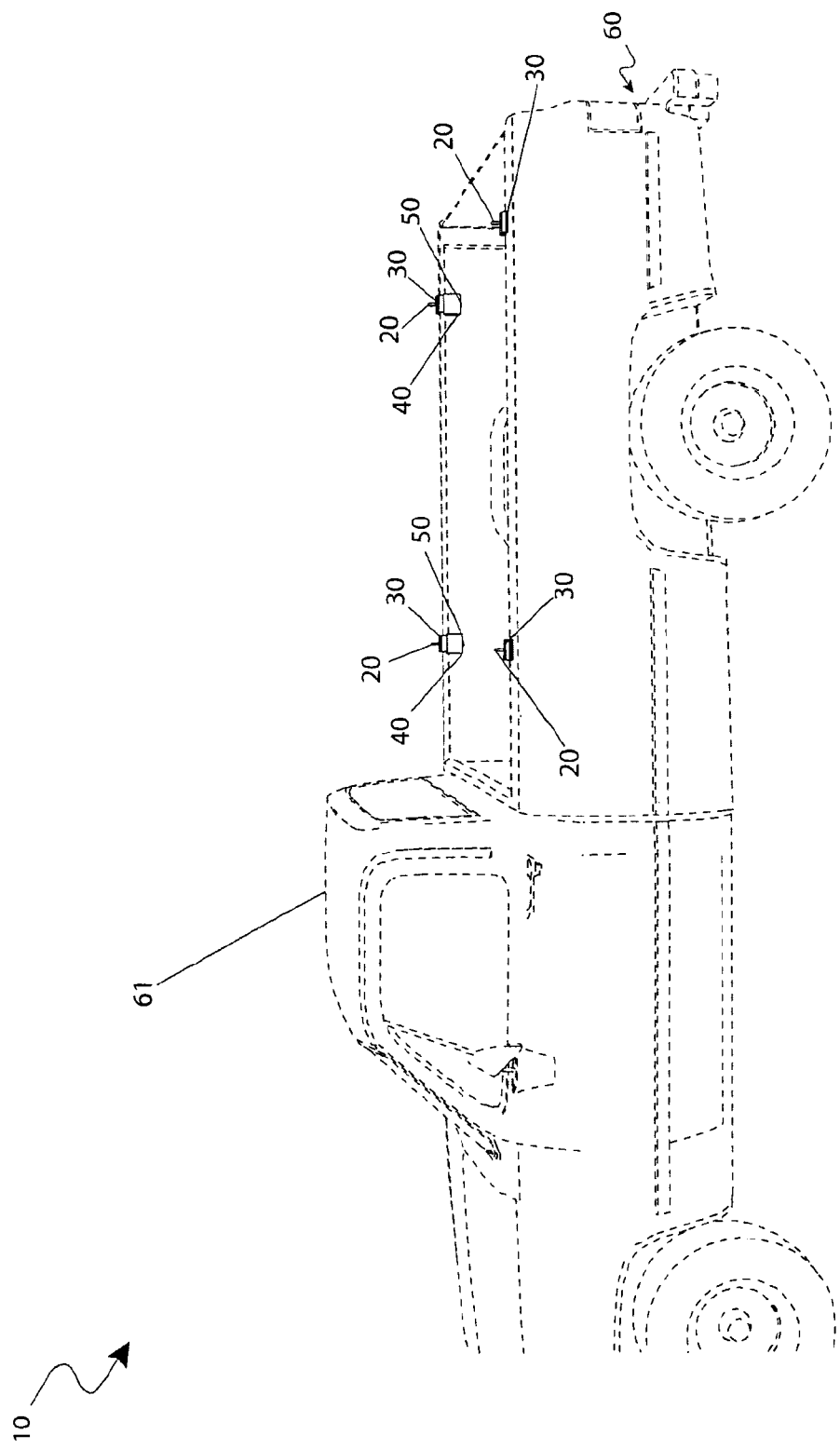
FIG. 2 is an environmental view of a plurality of attachable tie-down loops for a truck 10 depicted as attached, according to a preferred embodiment of the present invention.
Figure 3:
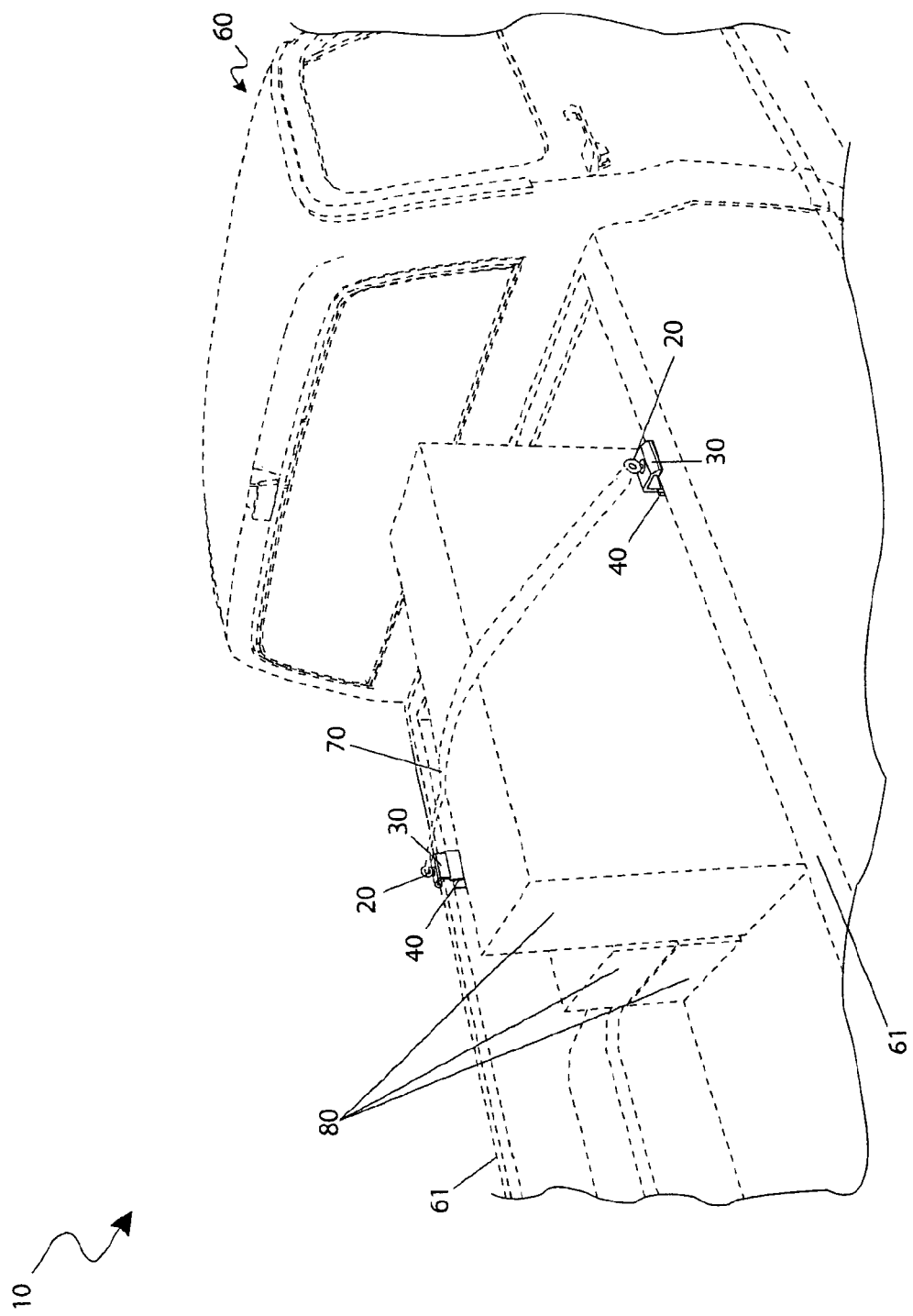
FIG. 3 is an environmental view of a plurality of attachable tie-down loops for a truck 10 depicted in an in-use state, according to a preferred embodiment of the present invention; and, FIG. 4 is a side view of the attachable tie-down loop for a truck 10 depicted as attached, according to a preferred embodiment of the present invention.

Referring now to FIGS. 2 and 3, various environmental views of the device 10, according to the preferred embodiment of the present invention, is disclosed. The device 10 is intended to be utilized singularly or in plurality as desired by the user. FIG. 2 illustrates four (4) devices 10 as attached thereto the upper rails 61 of the truck 60. Once attached the device 10 may remain on the upper rail 61 when not being utilized or may be easily removed and stored in the truck 60 for future use. FIG. 3 illustrates two (2) devices 10 as attached to the upper rails 61 of the truck 60 in a utilized state. Once mounted thereto the upper rail 61, a common tie-down 70 can be connected thereto the eyelet 21 in a normal manner and used to secure objects 80 which are being transported in the bed of the truck 60.

Figure 4:
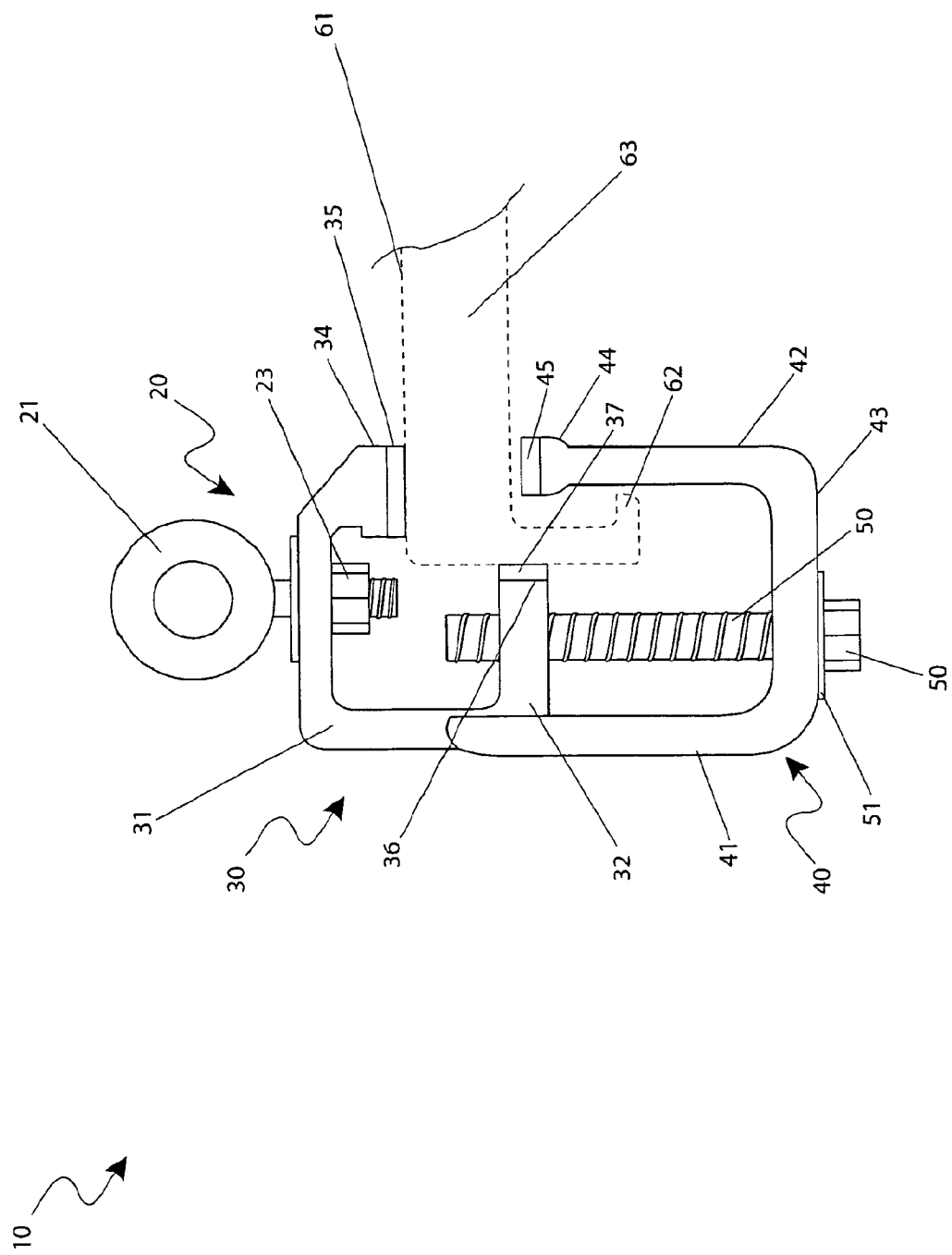

Referring now to FIG. 4, side view of the device 10 depicted as attached, according to a preferred embodiment of the present invention, is disclosed. FIG. 4 illustrates the positioning of the "C"-shaped bracket 30, the "U"-shaped bracket 40, and the bolt 50 as attached thereto the upper rail 61. The third vertical side 42 is positioned behind a side wall 62 of the upper rail 61 such that the third edge 44 can make contact therewith the bottom surface of said upper rail 61. When the bolt 50 is tightened, the "C"-shaped bracket 30 and the "U"-shaped bracket 40 approach one another, thus enabling the first edge 34 and the third edge 44 to clamp the horizontal wall 63 of the upper rail 61. The second edge 36 comprises a second liner 37 which is preferably a soft, flexible material such as rubber or the like which is affixed thereto and covers said second edge 36, thus preventing scratching or similar damage to the exterior of the truck 60. The second edge 36 and thus the second liner 37 make contact therewith an outer surface of the side wall 62 of the upper rail 61, thus providing additional stability to the device 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 2 and 3.

The method of utilizing the device 10 may be achieved by performing the following steps: retrieving a desired plurality of said device 10; positioning said plurality of said device 10 thereon the upper rails 61 of the truck 60 as desired depending on the orientation of the objects 80 in the bed of said truck 60; tightening the bolt 50, thus clamping said device 10 thereto said upper rail 61; connecting a first end of the tie-down 70 thereto the eyelet 21 of the eye bold 20 on a first device 10 in a normal manner; positioning said tie-down 70 thereover said objects 80; connecting a second end of said tie-down 70 thereto the eyelet 21 of a second device 10 in a normal manner; repeat the previous steps as needed to secure said objects 80 in said bed of said truck 60.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tie-down loop device for assisting a user to secure objects stored in a truck bed, said tie-down loop device comprising:
    a "C"-shaped bracket adapted to be slidingly clamped to an upper rail of the truck bed;
    a "U"-shaped bracket adapted to be slidingly clamped to the upper rail of the truck bed;
    a bolt threadably connected to said "C"-shaped bracket and said "U"-shaped bracket respectively; and,
    an eye bolt connected to said "C"-shaped bracket and remaining spaced above said "U"-shaped bracket;
    wherein said "C"-shaped bracket cooperates with said "U"-shaped bracket to simultaneously clamp the upper rail of the truck bed while said eye bolt is adapted to receive an existing tie-down strap.

2. The tie-down loop device of claim 1, wherein said eye bolt comprises: an eyelet and a lower threaded stem monolithically formed therewith.

3. The tie-down loop device of claim 2, wherein said "C"-shaped bracket comprises:
    a first horizontal side and a second horizontal side registered substantially parallel thereto;
    a first vertical side monolithically formed with each of said first and second horizontal sides respectively;
    a first edge located on a distal end of said first horizontal side, said first edge having an arcuate profile terminating approximately ninety degrees from said first horizontal side and thereby adapted to contact a top surface of the upper rail of the truck; and,
    a first liner covering said first edge for shielding the upper rail of the truck.

4. The tie-down loop device of claim 3, wherein said second horizontal side is shorter in length than said first horizontal side, said second horizontal side having a second edge located at a distal end thereof, said first horizontal side having a first aperture formed through a center portion thereof;
   wherein said stem is threadably mated to said first aperture along a travel path registered parallel to a longitudinal length of said bolt.

5. The tie-down loop device of claim 4, wherein said U-shaped bracket comprises:
   a second vertical side and a third vertical side registered parallel thereto;
   a third horizontal side monolithically formed with said second and third vertical sides;
   a third edge located at a distal end of said third vertical side, said third edge adapted to be engaged with a bottom surface of the upper rail of the truck bed; and,
   a third liner covering said third edge and for shielding the upper rail of the truck.

6. The tie-down loop device of claim 5, wherein said "U"-shaped bracket further comprises: a plurality of guide rails located on opposing outer edges of an inner surface of said second vertical side respectively, said guide rails defining a guide track and a receiving slot for guiding and receiving an outer surface of said first vertical side respectively to thereby maintain said C-shaped bracket at a substantially stable position.

7. The tie-down loop device of claim 6, wherein said second and third horizontal sides have second and third apertures formed therein respectively, said bolt being threadably engaged with said second and third apertures, wherein said second aperture is vertically aligned above said third aperture such that when said bolt is turned in a clockwise manner said second horizontal side of said "C"-shaped bracket approaches said third horizontal side of said "U"-shaped bracket and thereby decreases a linear spatial distance between said first edge and said third edge.

8. The tie-down loop device of claim 7, further comprising: a second liner covering said second edge for shielding the upper rail of the truck bed, wherein said second edge is adapted to contact an outer surface of the side wall of the upper rail of the truck bed;
   wherein said third vertical side is adapted to be positioned behind a side wall of the upper rail of the truck bed such that said third edge is adapted to contact a bottom surface of the upper rail of the truck bed.

9. The tie-down loop device of claim 8, wherein said "C"-shaped bracket and said "U"-shaped bracket linearly approach each other when said bolt is rotatably tightened and thereby adapt said first and third edges to clamp a horizontal wall of the upper rail of the truck bed.

10. A tie-down loop device for assisting a user to secure objects stored in a truck bed, said tie-down loop device comprising:
    a "C"-shaped bracket adapted to be slidingly clamped to an upper rail of the truck bed;
    a "U"-shaped bracket adapted to be slidingly clamped to the upper rail of the truck bed;
    a bolt threadably connected to said "C"-shaped bracket and said "U"-shaped bracket respectively; and,
    an eye bolt connected to said "C"-shaped bracket and remaining spaced above said "U"-shaped bracket;
    wherein said "C"-shaped bracket cooperates with said "U"-shaped bracket to simultaneously clamp the upper rail of the truck bed while said eye bolt is adapted to receive an existing tie-down strap; and,
    wherein said "C"-shaped bracket and said "U"-shaped bracket remain adjustably engaged together and thereby adapted to be slidably positioned along the upper rail of the truck bed.

11. The tie-down loop device of claim 10, wherein said eye bolt comprises: an eyelet and a lower threaded stem monolithically formed therewith.

12. The tie-down loop device of claim 11, wherein said "C"-shaped bracket comprises:
    a first horizontal side and a second horizontal side registered substantially parallel thereto;
    a first vertical side monolithically formed with each of said first and second horizontal sides respectively;
    a first edge located on a distal end of said first horizontal side, said first edge having an arcuate profile terminating approximately ninety degrees from said first horizontal side and thereby adapted to contact a top surface of the upper rail of the truck; and,
    a first liner covering said first edge for shielding the upper rail of the truck.

13. The tie-down loop device of claim 12, wherein said second horizontal side is shorter in length than said first horizontal side, said second horizontal side having a second edge located at a distal end thereof, said first horizontal side having a first aperture formed through a center portion thereof;
    wherein said stem is threadably mated to said first aperture along a travel path registered parallel to a longitudinal length of said bolt.

14. The tie-down loop device of claim 13, wherein said "U"-shaped bracket comprises:
    a second vertical side and a third vertical side registered parallel thereto;
    a third horizontal side monolithically formed with said second and third vertical sides;
    a third edge located at a distal end of said third vertical side, said third edge adapted to be engaged with a bottom surface of the upper rail of the truck bed; and,
    a third liner covering said third edge and for shielding the upper rail of the truck.

15. The tie-down loop device of claim 14, wherein said U-shaped bracket further comprises: a plurality of guide rails, located on opposing outer edges of an inner surface of said second vertical side respectively, said guide rails defining a guide track and a receiving slot for guiding and receiving an outer surface of said first vertical side respectively to thereby maintain said "C"-shaped bracket at a substantially stable position.

16. The tie-down loop device of claim 15, wherein said second and third horizontal sides have second and third apertures formed therein respectively, said bolt being threadably engaged with said second and third apertures, wherein said second aperture is vertically aligned above said third aperture such that when said bolt is turned in a clockwise manner said second horizontal side of said "C"-shaped bracket approaches said third horizontal side of said "U"-shaped bracket and thereby decreases a linear spatial distance between said first edge and said third edge.

17. The tie-down loop device of claim 16, further comprising: a second liner covering said second edge for shielding the upper rail of the truck bed, wherein said second edge is adapted to contact an outer surface of the side wall of the upper rail of the truck bed;
    wherein said third vertical side is adapted to be positioned behind a side wall of the upper rail of the truck bed such that said third edge is adapted to contact a bottom surface of the upper rail of the truck bed.

18. The tie-down loop device of claim 17, wherein said "C"-shaped bracket and said "U"-shaped bracket linearly approach each other when said bolt is rotatably tightened and thereby adapt said first and third edges to clamp a horizontal wall of the upper rail of the truck bed.

19. A method of utilizing a tie-down loop device for assisting a user to secure objects stored in a truck bed, said method comprising the steps of:

providing first and second tie-down loop devices each comprising a "C"-shaped bracket adapted to be slidingly clamped to an upper rail of the truck bed, a "U"-shaped bracket adapted to be slidingly clamped to the upper rail of the truck bed, a bolt threadably connected to said "C"-shaped bracket and said "U"-shaped bracket respectively, and an eye bolt connected to said "C"-shaped bracket and remaining spaced above said "U"-shaped bracket, wherein said "C"-shaped bracket cooperates with said "U"-shaped bracket to simultaneously clamp the upper rail of the truck bed while said eye bolt is adapted to receive an existing tie-down strap, wherein said "C"-shaped bracket and said "U"-shaped bracket remain adjustably engaged together and thereby adapted to be slidably positioned along the upper rail of the truck bed;

providing and connecting a first end of a tie-down strap to said eye bolt of said first tie-down loop device;

positioning said first tie-down strap over the objects; and, connecting a second end of said tie-down strap to said eye bolt of said second tie-down loop device.

* * * * *